United States Patent
Li et al.

(10) Patent No.: US 10,923,905 B2
(45) Date of Patent: Feb. 16, 2021

(54) INTELLIGENT CONTROL METHOD AND SYSTEM

(71) Applicant: BOE TECHNOLOGY GROUP CO., LTD., Beijing (CN)

(72) Inventors: Tao Li, Beijing (CN); Zhongwei Zhang, Beijing (CN); Zhiguo Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 98 days.

(21) Appl. No.: 16/116,709

(22) Filed: Aug. 29, 2018

(65) Prior Publication Data
US 2019/0296540 A1    Sep. 26, 2019

(30) Foreign Application Priority Data
Mar. 22, 2018 (CN) .......................... 2018 1 0239151

(51) Int. Cl.
*H02H 5/12* (2006.01)
*G01V 8/10* (2006.01)
(Continued)

(52) U.S. Cl.
CPC ................. *H02H 5/12* (2013.01); *G01V 8/10* (2013.01); *G05B 13/027* (2013.01);
(Continued)

(58) Field of Classification Search
CPC .......... H02H 5/12; H02H 1/0007; G01V 8/10; G05B 13/027; G05B 19/0423;
(Continued)

(56) References Cited

U.S. PATENT DOCUMENTS 8,953,841 B1    2/2015 Leblang et al.
2013/0044187 A1*  2/2013 Hammes .............. H04N 5/2256
                                                      348/46
(Continued)

FOREIGN PATENT DOCUMENTS

CN    201788571 U    4/2011
CN    102956084 A    3/2013
(Continued)

OTHER PUBLICATIONS

Chinese Office Action dated Nov. 13, 2019, from application No. 201810239151.0.
(Continued)

*Primary Examiner* — Mohammad Ali
*Assistant Examiner* — Sheela Rao
(74) *Attorney, Agent, or Firm* — Thomas | Horstemeyer LLP

(57) ABSTRACT

An intelligent control method includes monitoring whether a protected object is within a preset range of a dangerous device. The method includes starting a tracking mode for the protected object when monitoring that the protected object is within the preset range of the dangerous device. The method includes monitoring in real time whether the protected object satisfies a preset condition in the tracking mode, and cutting off a power supply of the dangerous device when the protected object satisfies the preset condition.

15 Claims, 7 Drawing Sheets

(51) Int. Cl.
  *G05B 13/02* (2006.01)
  *H02H 1/00* (2006.01)
  *H02J 13/00* (2006.01)
  *G05B 19/042* (2006.01)

(52) U.S. Cl.
  CPC ....... *G05B 19/0425* (2013.01); *H02H 1/0007* (2013.01); *H02J 13/00* (2013.01)

(58) Field of Classification Search
  CPC ............ G05B 2219/25257; H02J 13/00; H02J 13/0004; H02J 13/00017; H04N 7/18
  See application file for complete search history.

(56) References Cited

U.S. PATENT DOCUMENTS

| | | | | |
|---|---|---|---|---|
| 2014/0266600 A1* | 9/2014 | Alberth, Jr. | ............ | G05B 11/01 340/5.83 |
| 2014/0267736 A1* | 9/2014 | DeLean | ........... | G08B 13/19613 348/152 |
| 2017/0299696 A1* | 10/2017 | Fuller | ..................... | G01S 7/003 |
| 2017/0303187 A1* | 10/2017 | Crouthamel | ............ | H04W 4/80 |
| 2019/0018382 A1* | 1/2019 | Elkmann | ................ | G08B 21/22 |

FOREIGN PATENT DOCUMENTS

| | | |
|---|---|---|
| CN | 104750070 A | 7/2015 |
| CN | 105094009 A | 11/2015 |
| CN | 105335636 A | 2/2016 |
| CN | 106503666 A | 3/2017 |
| CN | 106713862 A | 5/2017 |

OTHER PUBLICATIONS

Chinese Office Action dated May 5, 2019, from application No. 201810239151.0.

Chinese Office Action dated Mar. 2, 2020, from application No. 201810239151.0.

* cited by examiner

INTELLIGENT CONTROL METHOD AND SYSTEM

CROSS REFERENCE

This application claims the priority to Chinese Patent Application No. 201810239151.0 filed on Mar. 22, 2018, entitled "intelligent control method and system", the entire contents of which are incorporated herein by reference.

TECHNICAL FIELD

The present disclosure relates to the field of intelligent control technology, and more particularly, to an intelligent control method and system.

BACKGROUND

With the improvement of living standards, many families have installed monitoring systems to monitor dynamic states of their homes when they are out. Especially for families with children, parents need to monitor their children's activities through the monitoring systems to prevent the children from being harmed by their own dangerous actions such as touching dangerous electrical appliances.

There exist a variety of monitoring systems on the current market, but most of them are passive monitoring systems, which require users to watch videos from mobile phone terminals or computer terminals to discover problems. Even if the passive monitoring systems can monitor the children while the children are performing dangerous actions such as touching induction cookers, no protective measures can be timely taken, and thus these passive monitoring systems cannot effectively help the children to avoid dangers.

It is to be noted that the above information disclosed in this Background section is only for enhancement of understanding of the background of the present disclosure and therefore it may contain information that does not form the prior art that is already known to a person of ordinary skill in the art.

SUMMARY

Other features and advantages of the present disclosure will become apparent from the following detailed description, or in part, by practice of the present disclosure.

According to an aspect of the present disclosure, there is provided an intelligent control method. The method includes monitoring whether a protected object is within a preset range of a dangerous device; starting a tracking mode for the protected object when monitoring that the protected object is within the preset range of the dangerous device; and monitoring in real time whether the protected object satisfies a preset condition in the tracking mode, and cutting off a power supply of the dangerous device when the protected object satisfies the preset condition. In an exemplary arrangement of the present disclosure, the monitoring whether a protected object is within a preset range of a dangerous device includes monitoring whether an unknown object exists within the preset range of the dangerous device; capturing image information of the unknown object when the unknown object exists within the preset range of the dangerous device; and determining whether the unknown object is the protected object based on the image information of the unknown object.

In an exemplary arrangement of the present disclosure, the monitoring in real time whether the protected object satisfies a preset condition includes monitoring in real time whether a distance between the protected object and the dangerous device is smaller than a preset distance; and monitoring in real time whether the protected object has a preset action.

In an exemplary arrangement of the present disclosure, the cutting off a power supply of the dangerous device includes transmitting a request of cutting off the power supply of the dangerous device to a router, such that the router cuts off the power supply of the dangerous device by way of wireless control.

In an exemplary arrangement of the present disclosure, the intelligent control method further includes receiving feature information of the protected object and feature information of the dangerous device to store the feature information into a sample database.

In an exemplary arrangement of the present disclosure, the intelligent control method further includes emitting preset audio to attract the protected object to leave when the protected object satisfies the preset condition; or starting the preset device to attract the protected object to leave when the protected object satisfies the preset condition.

In an exemplary arrangement of the present disclosure, the intelligent control method further includes transmitting a processing result indicative of cutting off or not cutting off the power supply of the dangerous device to a client, and carrying out a deep learning based on feedback information returned in response to the processing result.

According to another aspect of the present disclosure, there is provided an intelligent control system. The intelligent control system includes a monitoring module, configured to monitor whether a protected object is within a preset range of a dangerous device.

The intelligent control system further includes a tracking module, configured to start a tracking mode for the protected object when monitoring that the protected object is within the preset range of the dangerous device; and a control module, configured to cut off a power supply of the dangerous device when the protected object satisfies the preset condition.

The monitoring module is further configured to monitor in real time whether the protected object satisfies a preset condition in the tracking mode.

In an exemplary arrangement of the present disclosure, the monitoring module includes an infrared sensor, configured to monitor whether an unknown object exists within the preset range of the dangerous device; an image capturing apparatus, configured to capture image information of the unknown object when the unknown object exists within the preset range of the dangerous device; a processing unit, configured to determine whether the unknown object is the protected object based on the image information of the unknown object; and a distance sensor, configured to monitor in real time whether a distance between the protected object and the dangerous device is smaller than a preset distance.

The image capturing apparatus is further configured to monitor in real time whether the protected object has a preset action.

In an exemplary arrangement of the present disclosure, the control module includes a first control unit, configured to transmit a request of cutting off the power supply of the dangerous device to a router, such that the router cuts off the power supply of the dangerous device by way of wireless control; a second control unit, configured to control a loudspeaker to emit preset audio to attract the protected object to leave when the protected object satisfies the preset condition; and a training unit, configured to transmit a processing result indicative of cutting off or not cutting off the power supply of the dangerous device to a client, and carry out a deep learning based on feedback information returned in response to the processing result.

It should be understood that the above general description and the detailed description below are merely exemplary and explanatory, and do not limit the present disclosure.

BRIEF DESCRIPTION OF THE DRAWINGS

The accompanying drawings herein are incorporated in and constitute a part of this specification, illustrate arrangements conforming to the present disclosure and together with the description serve to explain the principles of the present disclosure. Apparently, the accompanying drawings in the following description show merely some arrangements of the present disclosure, and persons of ordinary skill in the art may still derive other drawings from these accompanying drawings without creative efforts.

DETAILED DESCRIPTION

Figure 1:
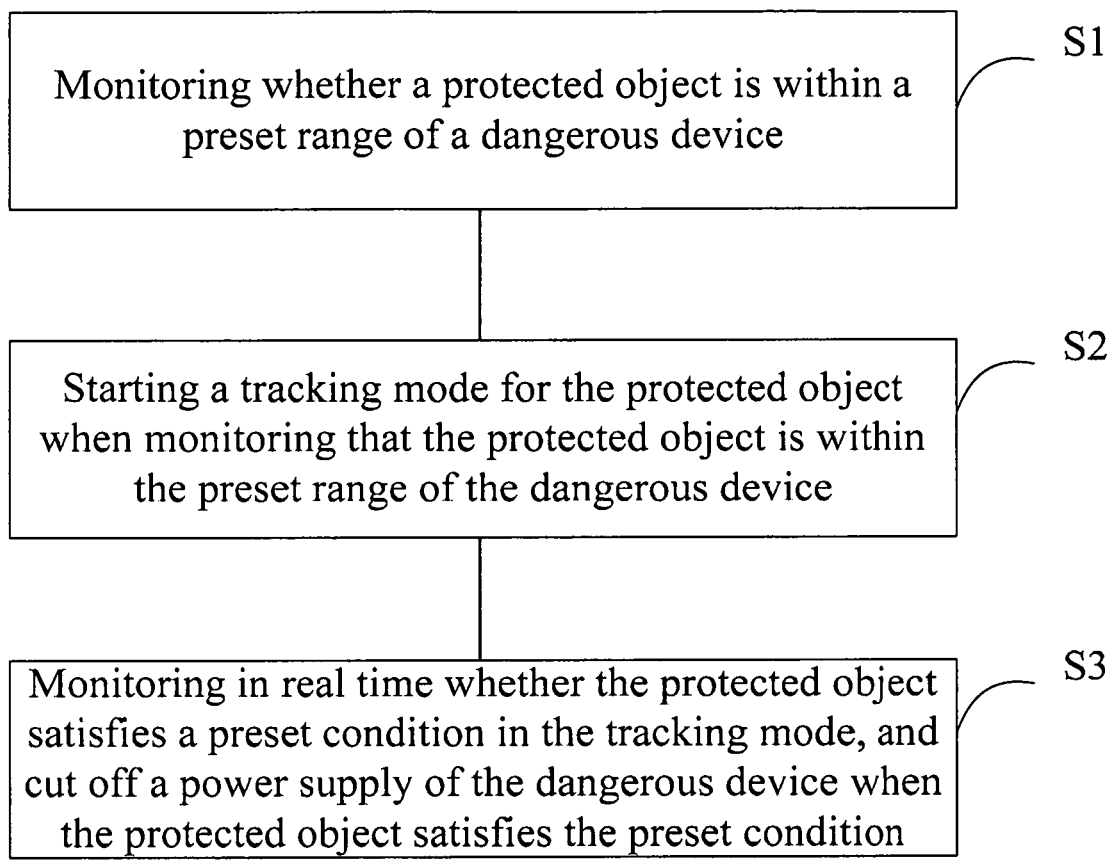
FIG. 1 schematically illustrates Flowchart I of an intelligent control method according to an exemplary arrangement of the present disclosure.

Exemplary arrangements will be described more comprehensively by referring to accompanying drawings now. However, the exemplary arrangements can be embodied in many forms and should not be construed as limited to the arrangements set forth herein; rather, these arrangements are provided so that this disclosure will be made thorough and complete, and the concept of exemplary arrangements will be fully conveyed to those skilled in the art. Furthermore, the described features, structures, or characteristics may be combined in any suitable manner in one or more arrangements.

In addition, the accompanying drawings are merely exemplary illustration of the present disclosure, and are not necessarily drawn to scale. The same reference numerals in the drawings denote the same or similar parts, and thus repeated description thereof will be omitted. Some block diagrams shown in the figures are functional entities and not necessarily to be corresponding to a physically or logically individual entities. These functional entities may be implemented in software form, or implemented in one or more hardware modules or integrated circuits, or implemented in different networks and/or processor apparatuses and/or microcontroller apparatuses.

Most of existing monitoring systems are passive monitoring systems and only have functions of recording videos and feeding the videos back to a client. While using the existing monitoring systems, users have to discover problems by watching the videos at the client and solve the problems themselves. There exist some active monitoring systems (for example, those including a processing module connected to a camera) that can additionally cut off the power supply of the dangerous device when the camera captures that children getting close to the dangerous device. However, such active monitoring systems have low recognition accuracy and thus tend to cause mistakes.

This exemplary arrangement provides an intelligent control method, as shown in FIG. 1, the intelligent control method may include:

S1: monitoring whether a protected object is within a preset range of a dangerous device;

S2: starting a tracking mode for the protected object when monitoring that the protected object is within the preset range of the dangerous device; and S3: monitoring in real time whether the protected object satisfies a preset condition in the tracking mode, and cutting off a power supply of the dangerous device when the protected object satisfies the preset condition.

The dangerous device may be connected to a power socket controlled by an intelligent control system; or the dangerous device may be internally provided with an intelligent switch controlled by the intelligent control system.

It is to be noted that the protected object refers to groups needing to be protected, for example, children or the aged; and the dangerous device refers to an electric power-driven device having certain danger, for example, an induction cooker or an electric heater, etc.

According to the intelligent control method provided by the exemplary arrangements of the present disclosure, it is determined whether a protected object gets close to a dangerous device by tracking and monitoring the protected object, and a power supply of the dangerous device is automatically cut off when it is determined that the protected object indeed gets close to the dangerous device. In this way, the objective of protecting the protected object is achieved. In one aspect, using a tracking and monitoring mechanism may ensure an information capture efficiency and prevent a missing capture. In another aspect, setting a preset condition and regarding the preset condition as a criterion of determining whether the protected object gets close to the dangerous device may effectively prevents a misjudgment. In this way, the accuracy of intelligent control may be increased.

The intelligent control method provided by this exemplary arrangement of the present disclosure is described in detail below with reference to the accompanying drawings.

In this exemplary arrangement, before Step S1, predefining the protected object and the dangerous device may be helpful. For example, feature information of the protected object and feature information of the dangerous device need to be uploaded to a sample database of the intelligent control system in advance, such that the protected object and the dangerous device are recognized.

Figure 2:
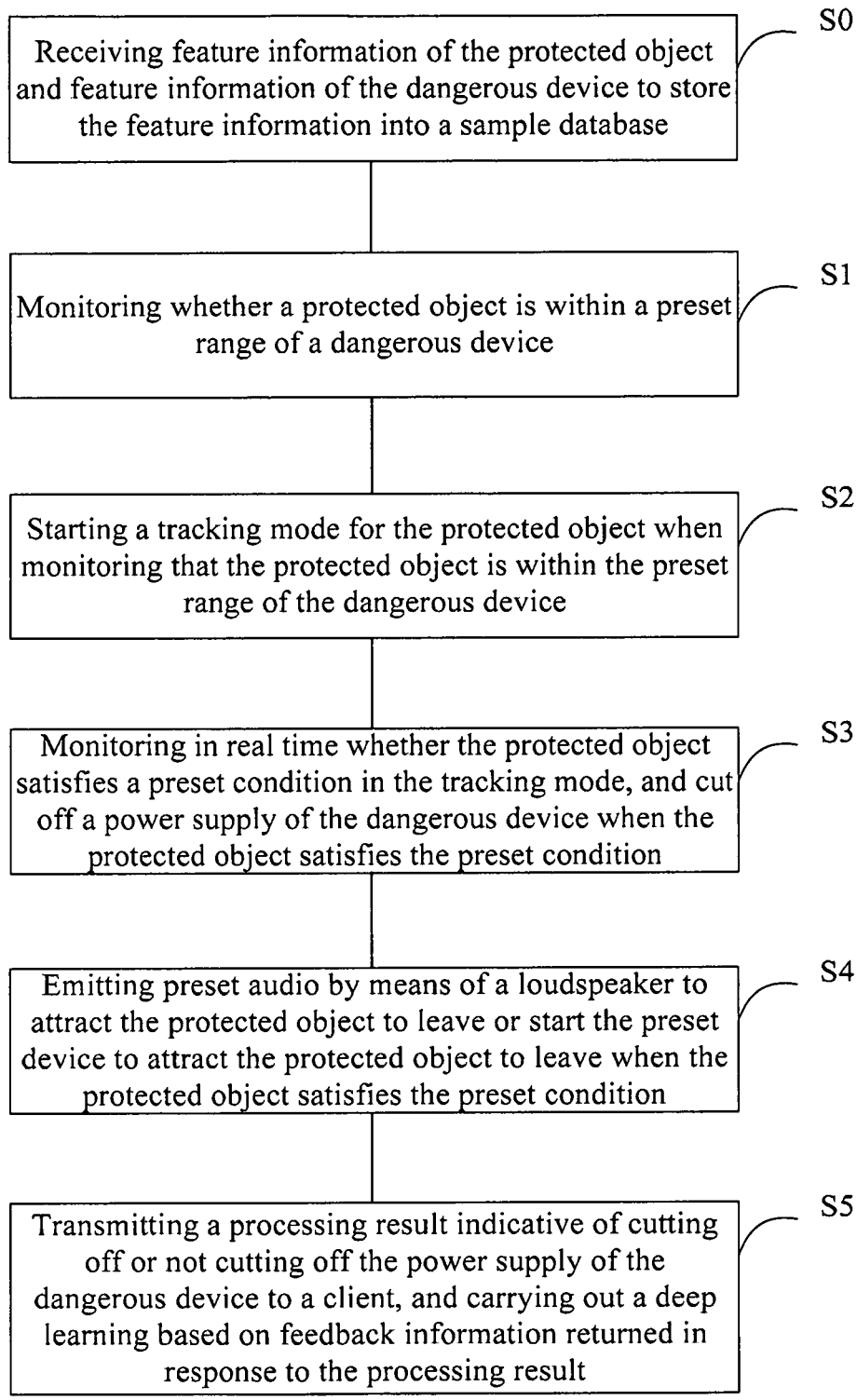
FIG. 2 schematically illustrates Flowchart II of an intelligent control method according to an exemplary arrangement of the present disclosure.

On this basis, as shown in FIG. 2, the intelligent control method may further include:

S0: receiving feature information of the protected object and feature information of the dangerous device to store the feature information into a sample database.

The feature information of the protected object may include multi-angle image information, for example, photos and videos, physique information such as height and weight, face shape, skin color, and hair, etc. The feature information of the dangerous device may include appearance, height and color of the device or the like.

It is to be noted that the protected object may include a plurality of objects, for example, two children; and the dangerous device may include a plurality of devices such as an induction cooker, an electric heater or an electric fan, etc.

Figure 3:
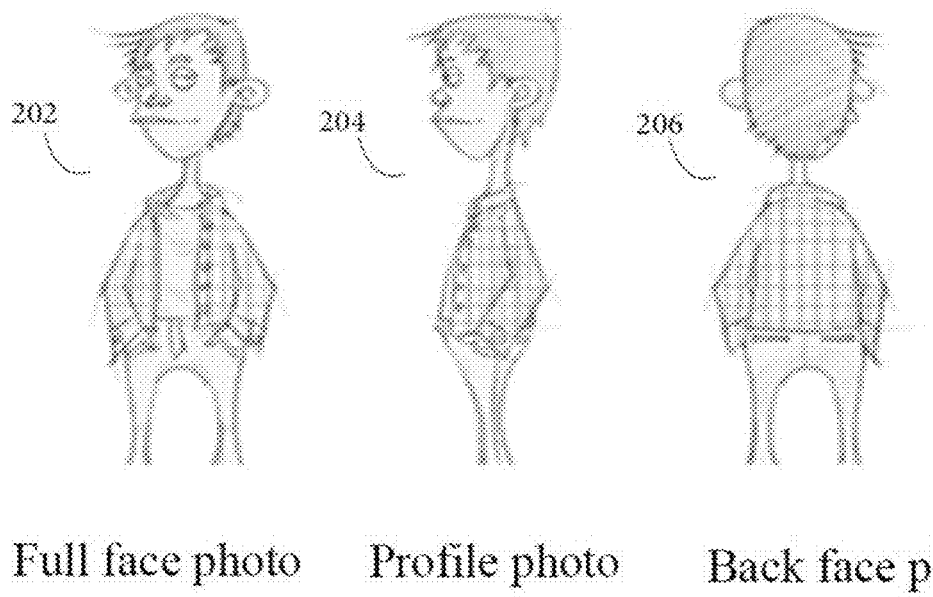
FIG. 3 schematically illustrates a schematic diagram of a method for capturing image information according to an exemplary arrangement of the present disclosure.

In this exemplary arrangement, the feature information of the protected object may be obtained in the following way: opening a client's APP (Application) and entering an information capture mode, capturing multi-direction and multi-angle image information for the protected object under the column of "Protected Object" according to instructions, and submitting the captured image information to the intelligent control system through the APP. As shown in FIG. 3, such multi-direction and multi-angle image information for a protected object may include a full face photo of the protected object 202, a profile photo of the protected object 204, and a back face photo of the protected object 206. The image information may be obtained by means of a camera built in a mobile phone, or also may be obtained by connecting a mobile phone to a monitoring camera and controlling the monitoring camera via the mobile phone, or even a plurality of photos or videos may be directly selected from a mobile phone photo library and uploaded, which are not limited in this arrangement.

Similarly, the feature information of the dangerous device also may be obtained in a similar way. In consideration of a fact that the dangerous device generally is placed on a certain fixed location and the monitoring camera generally is installed at a fixed location, to improve the monitoring accuracy and restore real scenes, in this arrangement, the monitoring camera is employed to capture the image information of the dangerous device, and both height information and distance information on the dangerous device and the monitoring camera are inputted into the APP before capturing the image information, and then the image information is captured according to the instructions.

In Step S1, it is monitored whether a protected object is within a preset range of a dangerous device.

In this exemplary arrangement, the monitoring whether a protected object is within a preset range of a dangerous device may specifically include:

monitoring whether an unknown object exists within the preset range of the dangerous device by using an infrared sensor;

capturing image information of the unknown object by using an image capturing apparatus (i.e., a monitoring camera) and transmitting the image information to a processing unit when the unknown object exists within the preset range of the dangerous device; and comparing and recognizing, by the processing unit, the captured image information of the unknown object with the feature information of the protected object prestored in the sample database to determine whether the unknown object is the protected object.

The unknown object may include the protected object, for example, children and other people such as normal adults except for the protected object. The preset range of the dangerous device refers to an area centering on the dangerous device and within a particular distance, which may be in the range of one meter and two meters, for example.

On this basis, in this step, it is first detected whether someone bursts into the preset range of the dangerous device, image information thereof is captured when it is determined that someone bursts into the preset range of the dangerous device, and then the captured image information of the unknown object is compared with the feature information of the protected object prestored in the sample database, such that it is determined whether the unknown object is the protected object based on the comparison result. In this way, it may be known whether the protected object is within the preset range of the dangerous device.

It is to be noted that if it is determined that the unknown object is not the protected object based on the comparison result, the monitoring camera may keep on turning at the original speed and direction. Subsequent steps may be performed if it is determined that the unknown object is the protected object.

In Step S2: a tracking mode for the protected object is started when monitoring that the protected object is within the preset range of the dangerous device.

In this exemplary arrangement, the tracking mode refers to locking the protected object and performing a tracking monitoring on the protected object. This tracking monitoring may achieve consecutive image capture, and thus can significantly increase the information capture efficiency and prevent a missing capture to obtain more effective information, such that the accuracy of intelligent control can be increased on the basis of the effective information. To achieve consecutive image capture, in this arrangement, the monitoring camera is controlled by a motor to keep on turning, or images captured by a 360° panoramic camera.

In Step S3, it is monitored in real time whether the protected object satisfies a preset condition in the tracking mode, and a power supply of the dangerous device is cut off when the protected object satisfies the preset condition.

In this exemplary arrangement, the preset condition may include: a distance between the protected object and the dangerous device being smaller than a preset distance, and the protected object having a preset action, but the preset condition is not limited thereto.

On this basis, the monitoring in real time whether the protected object satisfies a preset condition may include:

monitoring in real time whether a distance between the protected object and the dangerous device is smaller than a preset distance by using a distance sensor; and monitoring in real time whether the protected object has the preset action by using the image capturing apparatus (i.e., the monitoring camera).

The preset distance refers to a safety distance between the protected object and the dangerous device. The safety distance may be, for example, within 0.3 meter. The preset action refers to a symbolic action indicative of the protected object wanting to touch the dangerous device. This symbolic action may include, for example, lifting arms, etc.

As thus, if in the screen it is found that there is a displacement between consecutively-captured images of the protected object such as children within preset time and upon an analysis it is concluded that the protected object gets closer to the dangerous device and the protected object has an action of lifting arms, it can be regarded that the protected object is in a dangerous state, and thus the power supply of the dangerous device should be timely cut off.

On this basis, the cutting off the power supply of the dangerous device may include:

transmitting a request of cutting off the power supply of the dangerous device to a router, such that the router cuts off the power supply of the dangerous device by way of wireless control.

Figure 4:
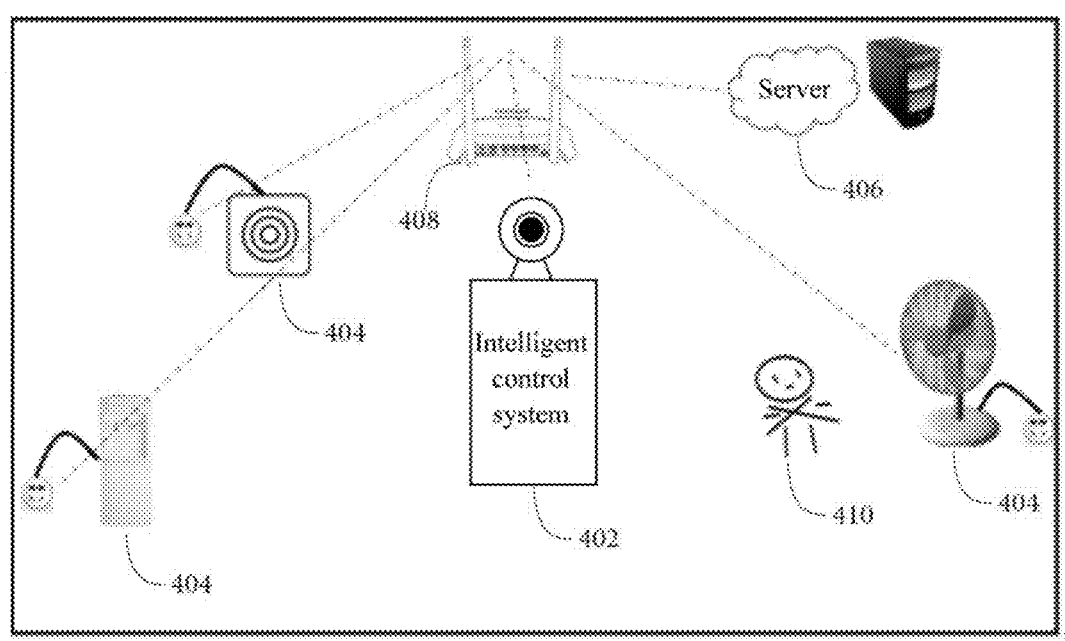
FIG. 4 schematically illustrates a schematic diagram of a connection relation between an intelligent control system, a dangerous device and a router according to an exemplary arrangement of the present disclosure.

FIG. 4 is a schematic diagram of a connection relation between an intelligent control system 402, one or more dangerous devices 404, a server 406, a router 408, and a protected object 410 according to this exemplary arrangement. In this arrangement, both the intelligent control system 402 and the one or more dangerous devices 404 are connected to the router 408 by way of wireless communication such as WiFi (Wireless Fidelity), but not limited thereto. The intelligent control system 402 and the one or more dangerous devices 404 also may be connected to the router 408 by way of wired communication.

It is to be noted that the preset conditions in Step S301 and Step S302 are an "and" relation. That is, only both the preset conditions in Step S301 and Step S302 are simultaneously satisfied can it be deemed that the preset condition is satisfied. For example, if it is only monitored that the protected object gets closer to the dangerous device but the protected object does not have an action of lifting arms or it is only monitored that the protected object has an action of lifting arms but the distance between the protected object and the dangerous device is not within the preset distance, it can be regarded that the protected object passes the dangerous device instead of touching the dangerous device, and no measure needs to be taken in such a case.

Based on the above intelligent control method, to improve the precision of capturing images, no matter the feature information of the protected object or the feature information of the dangerous device is obtained in advance or it is in an actual monitoring process, the intelligent control method may further include: detecting intensity of ambient light by using an illumination sensor to improve precision of the sample database based on the intensity of ambient light.

It is to be noted that the sample database not only stores the feature information of the protected object and the feature information of the dangerous device obtained in advance, but also stores image or video information captured in the monitoring process as the monitoring continuously proceeds.

In this exemplary arrangement, in consideration of a fact that some dangerous devices such as an electric fan may still rotate for some time before they completely stop even though their power supplies are cut off, there is still a certain danger if the protected object touches the electric fan before it completely stops. Therefore, while the power supplies of these dangerous devices are cut off, it is also expected that the protected object may stay away from these dangerous devices.

On this basis, referring to FIG. 2, the intelligent control method may further include:

S4: emitting preset audio by means of a loudspeaker to attract the protected object to leave when the protected object satisfies the preset condition; or starting the preset device to attract the protected object to leave when the protected object satisfies the preset condition.

The preset audio may be a prerecorded recording of calling name of the protected object or children's songs that can attract attention of the protected object, etc. The preset device may be an intelligent toy or the like having functions of singing, storytelling, or dialoguing. The intelligent toy also is connected to the router by way of wireless communication such as WiFi.

As thus, by using the intelligent control method provided by this exemplary arrangement, while the power supply of the dangerous device is cut off, the protected object may be attracted to get away from the dangerous device, thus playing a role in double protection.

More further, to continuously increase the accuracy of the intelligent control method, also an intelligent learning function may be added into the intelligent control system. On this basis, referring to FIG. 2, the intelligent control method may further include:

S5: transmitting a processing result indicative of cutting off or not cutting off the power supply of the dangerous device to a client, and carrying out a deep learning based on feedback information returned in response to the processing result.

The deep learning may be implemented by means of a neural network model established on the basis of a recurrent neural network (RNN) or a convolutional neural network (CNN) or a deep neural network (DNN).

Specifically, after each intelligent control is completed according to the intelligent control method provided by this arrangement, a user may view a processing result by means of the APP, and feed back correctness of the processing result. On this basis, according to the intelligent control method, the pre-captured feature information, all sorts of information obtained in the control process and information fed back based on the processing result or the like may be used as input features to carry out a deep learning by means of the above neural network model so as to constantly improve accuracy rate of judgment results and make sure that the accuracy rate of the whole intelligent control system may constantly improve as frequency of use increases.

Exemplary description of the deep learning process in the intelligent control method is made below. According to the deep learning technology, training is carried out by using the sample database containing the feature information of the protected object and the feature information of the dangerous device to implement an intelligent recognition. The feature information of the protected object may include feature information, for example, height, face shape, facial features, skin color, and hair, etc. The feature information of the dangerous device may include appearance, height, color and shape, etc.

First, the feature information of the protected object and the feature information of the dangerous device may be extracted and recognized to establish the neural network model configured to implement the deep learning.

Next, the recognition is divided into two levels. In the first level of recognition, height, skin color, expression and facial feature models are established for the protected object, and appearance, color and state models are established for the dangerous device. It should be noted that images of the protected object and the dangerous device at different distances are required to be captured, the skin color of the protected object and the color of the dangerous device should be captured under different illumination intensities, and samples in the sample database should be abundant enough. In the second level of recognition, the feature models of the protected object and the feature models of the dangerous device obtained from the first level of recognition and samples obtained at different distances are used as inputs, and the distance and whether the distance between the protected object and the dangerous device being less than the preset distance are used as outputs.

Finally, image samples captured in the case of misjudgment are analyzed according to information fed back based on each processing result, and a deep learning is carried out in connection with illumination data transmitted by the illumination sensor.

Figure 5:
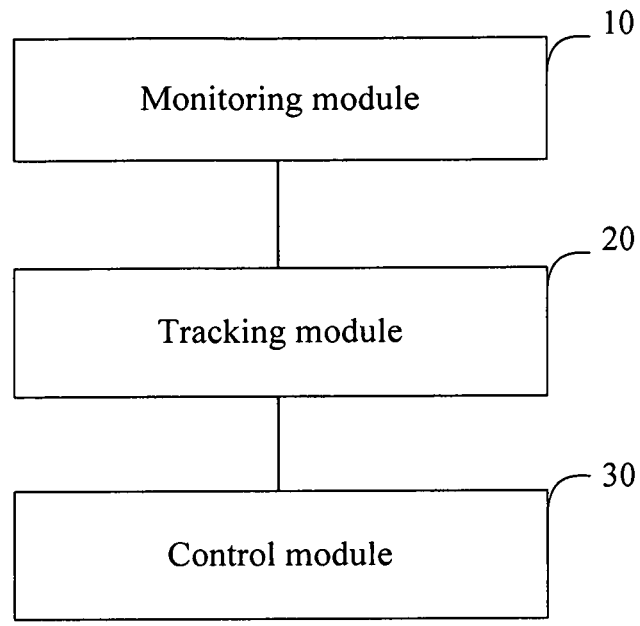
FIG. 5 schematically illustrates a schematic diagram of modules of the intelligent control system according to an exemplary arrangement of the present disclosure.

Based on the above intelligent control method, this exemplary arrangement further provides an intelligent control system 500. The intelligent control system 402 of FIG. 4 may be implemented as the intelligent control system 500. As shown in FIG. 5, the intelligent control system 500 may include:

a monitoring module 10, configured to monitor whether a protected object is within a preset range of a dangerous device;

a tracking module 20, configured to start a tracking mode for the protected object when monitoring that the protected object is within the preset range of the dangerous device; and a control module 30, configured to cut off a power supply of the dangerous device when the protected object satisfies the preset condition. The monitoring module 10 is further configured to monitor in real time whether the protected object satisfies a preset condition in the tracking mode.

The preset condition may include: a distance between the protected object and the dangerous device being smaller than a preset distance, and the protected object having a preset action, but the preset condition is not limited thereto.

According to the intelligent control system provided by the exemplary arrangements of the present disclosure, it is determined whether a protected object gets close to a dangerous device by tracking and monitoring the protected object, and a power supply of the dangerous device is automatically cut off when it is determined that the protected object indeed gets close to the dangerous device. In this way, the objective of protecting the protected object is achieved. In one aspect, using a tracking and monitoring mechanism may ensure an information capture efficiency and prevent a missing capture. In another aspect, setting a preset condition and regarding the preset condition as a criterion of determining whether the protected object gets close to the dangerous device may effectively prevents a misjudgment. In this way, the accuracy of intelligent control may be increased.

Figure 6:
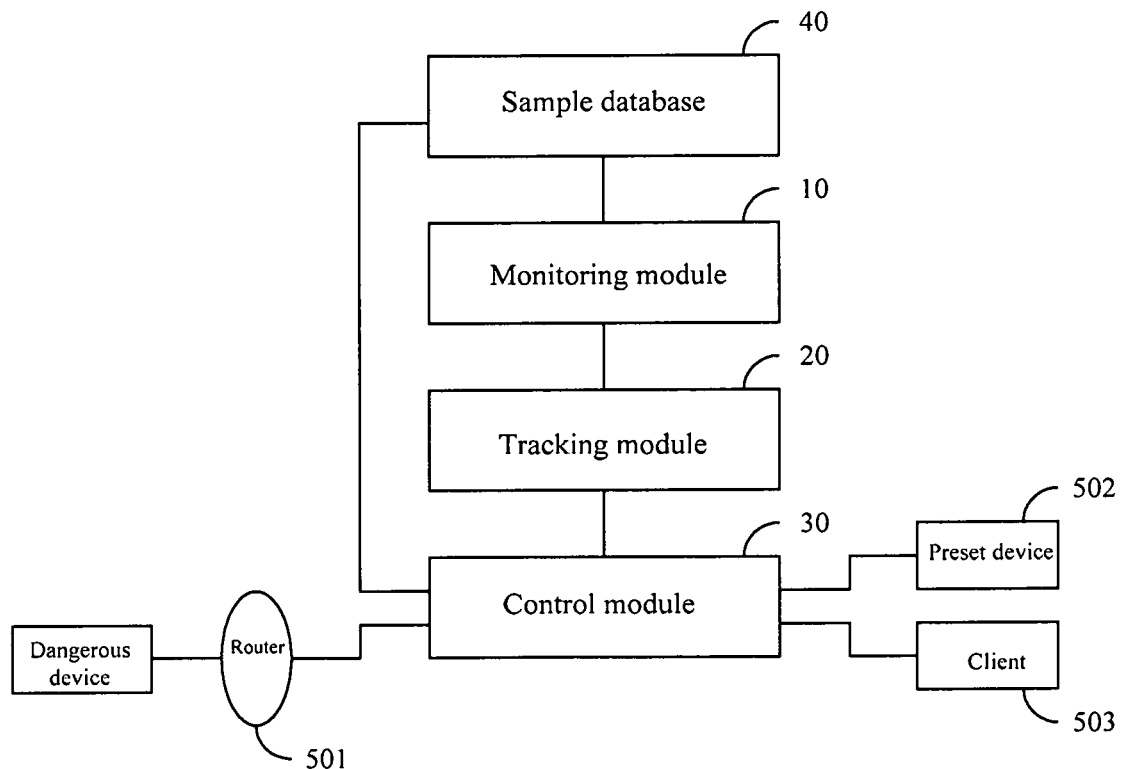
FIG. 6 schematically illustrates an architecture diagram of the intelligent control system according to an exemplary arrangement of the present disclosure.

An exemplary description of the intelligent control system is made below with reference to an architecture diagram of the intelligent control system as shown in FIG. 6. The intelligent control system may include the monitoring module 10, the tracking module 20, the control module 30, and a sample database 40. The intelligent control system is connected to a router 501, a preset device 502, and a client 503.

Figure 7:
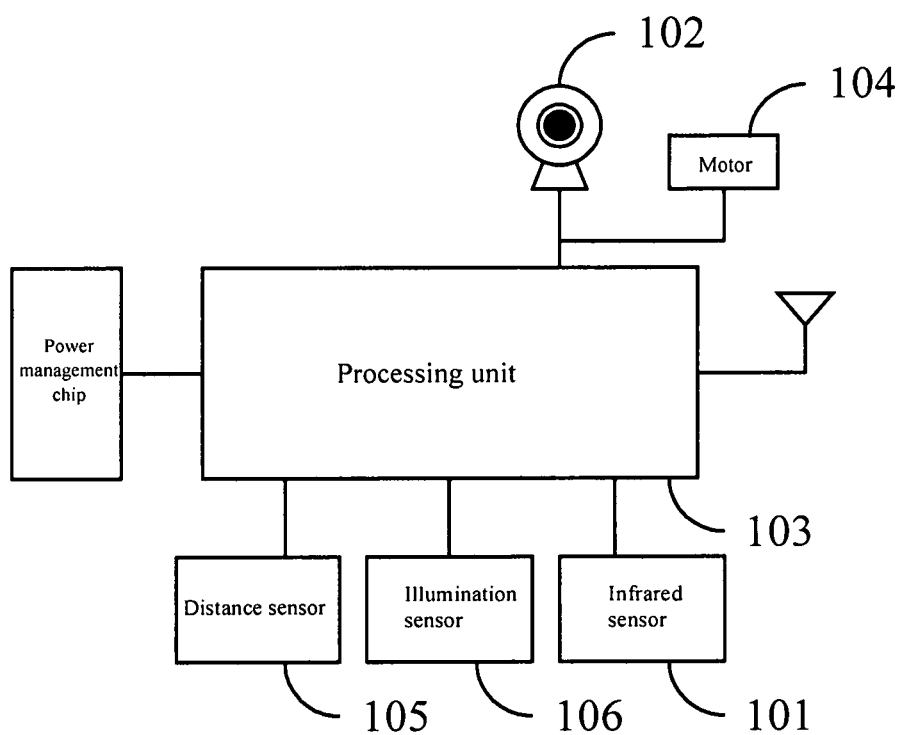
FIG. 7 schematically illustrates a schematic diagram of a monitoring module according to an exemplary arrangement of the present disclosure.

As shown in FIG. 7, the monitoring module 10 may be configured to monitor whether the protected object is within the preset range of the dangerous device, and specifically may include:

an infrared sensor 101, configured to monitor whether an unknown object exists within the preset range of the dangerous device;

an image capturing apparatus 102 (i.e., the monitoring camera), configured to capture image information of the unknown object when the unknown object exists within the preset range of the dangerous device; and a processing unit 103, configured to determine whether the unknown object is the protected object based on the image information of the unknown object.

The monitoring camera may be an ordinary camera and may be connected to a motor 104 to keep on turning under the control of the motor 104. Alternatively, the monitoring camera also may be panoramic camera to capture images within a range of 360 degrees.

Further, the monitoring module 10 may be further configured to monitor in real time whether the protected object satisfies the preset condition in the tracking mode, and specifically may include:

a distance sensor 105, configured to monitor in real time whether the distance between the protected object and the dangerous device is smaller than the preset distance.

The image capturing apparatus 102 is further configured to monitor in real time whether the protected object has a preset action.

Further, the monitoring module 10 also may be configured to detect ambient illumination intensity, and specifically may include:

an illumination sensor 106, configured to detect intensity of ambient light to improve precision of the sample database based on the intensity of ambient light.

Referring to FIG. 6, the tracking module 20 may be configured to select a tracking mode. The tracking mode refers to locking the protected object and performing a tracking monitoring on the protected object. This tracking monitoring may achieve consecutive image capture, and thus can significantly increase the information capture efficiency and prevent a missing capture to obtain more effective information, such that the accuracy of intelligent control can be increased on the basis of the effective information.

Figure 8:
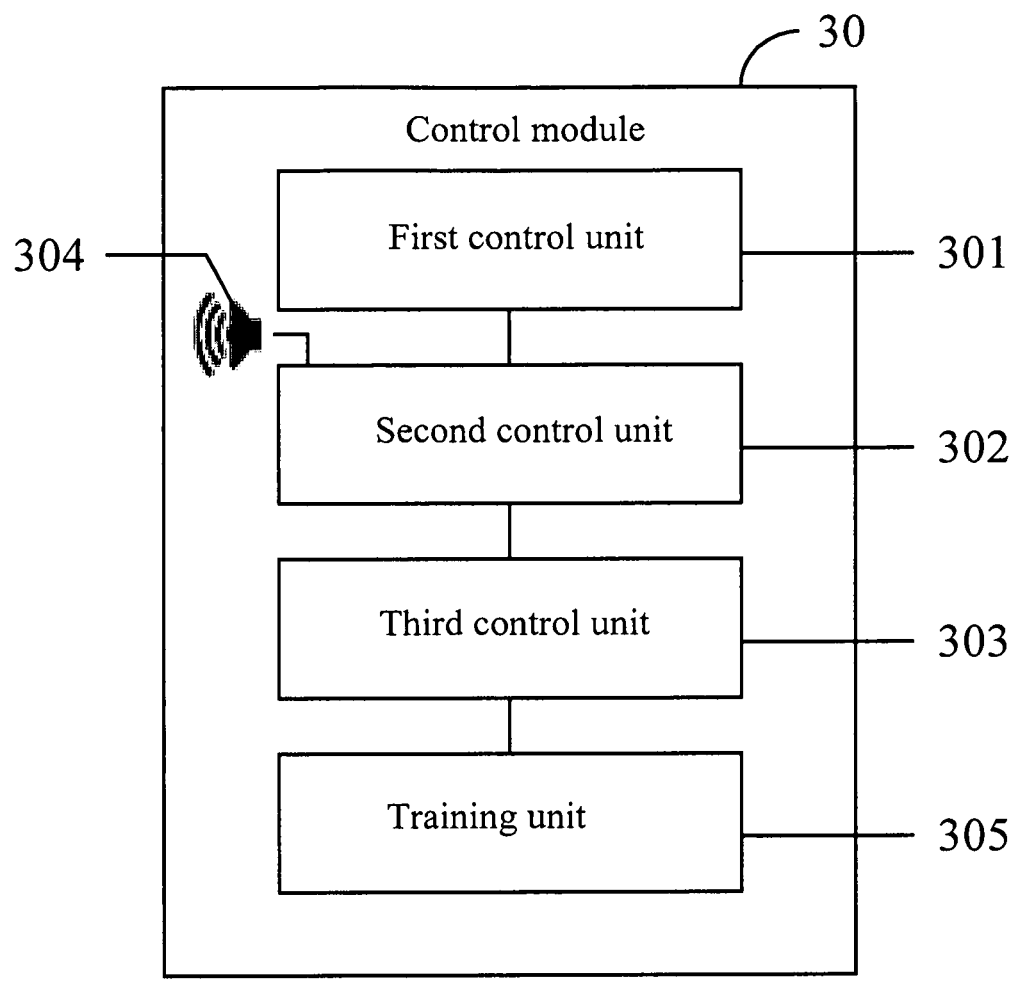
FIG. 8 schematically illustrates a schematic diagram of a control module according to an exemplary arrangement of the present disclosure.

As shown in FIG. 8, the control module 30 may be configured to cut off the power supply of the dangerous device when the protected object satisfies the preset condition, and specifically may include:

a first control unit 301, configured to transmit a request of cutting off the power supply of the dangerous device to a router, such that the router cuts off the power supply of the dangerous device by way of wireless control.

While the power supply of the dangerous device is cut off, it is also expected that the protected object can keep away from the dangerous device. In this way, the effect of double protection of the protected object is implemented.

On this basis, the control module 30 also may be configured to attract the protected object to leave in particular ways when the protected object satisfies the preset condition, and specifically may include:

a second control unit 302, configured to control a loudspeaker 304 to emit preset audio to attract the protected object to leave when the protected object satisfies the preset condition; and a third control unit 303, configured to start the preset device 502 to attract the protected object to leave when the protected object satisfies the preset condition.

The control unit can include a controller and perform its functions through a controller and program To continuously increase the accuracy of the intelligent control system, an intelligent learning function may be added into the intelligent control system. On this basis, referring to FIG. 8, the control module 30 may further include:

a training unit 305, configured to transmit a processing result indicative of cutting off or not cutting off the power supply of the dangerous device to the client 503, and carry out a deep learning based on feedback information returned in response to the processing result.

In this exemplary arrangement, referring to FIG. 6, the intelligent control system may further include a sample database 40, which is configured to store feature information of the protected object and feature information of the dangerous device that are captured in advance, and also is configured to store images or video information acquired in the monitoring process.

It is to be noted that specific details of the intelligent control system have been described in detail in the corresponding intelligent control method, and thus their detailed descriptions are omitted herein.

It is to be noticed that although a plurality of modules or units of the device for action execution have been mentioned in the above detailed description, this partition is not compulsory. Actually, according to the arrangement of the present disclosure, features and functions of two or more modules or units as described above may be embodied in one module or unit. Reversely, features and functions of one module or unit as described above may be further embodied in more modules or units.

In addition, steps of the method in the present disclosure are described in a particular order in the accompanying drawings. However, this does not require or imply to execute these steps necessarily according to the particular order, or this does not mean that the expected result cannot be implemented unless all the shown steps are executed. Additionally or alternatively, some steps may be omitted, a plurality of steps may be combined into one step for execution, and/or one step may be decomposed into a plurality of steps for execution.

In an exemplary arrangement of the present disclosure, there is further provided an electronic device capable of implementing the above method.

As will be appreciated by one skilled in the art, aspects of the present disclosure may be embodied as a system, method or program product. Accordingly, aspects of the present disclosure may take the form of an entirely hardware arrangement, an entirely software arrangement (including firmware, micro-code, etc.) or an arrangement combining software and hardware aspects that may all generally be referred to herein as a "circuit," "module" or "system."

The electronic device 600 according to this arrangement of the present disclosure is described below with reference to FIG. 9. The electronic device 600 as shown in FIG. 9 is merely an example, and no limitation should be imposed on functions or scope of use of the arrangement of the present disclosure.

Figure 9:
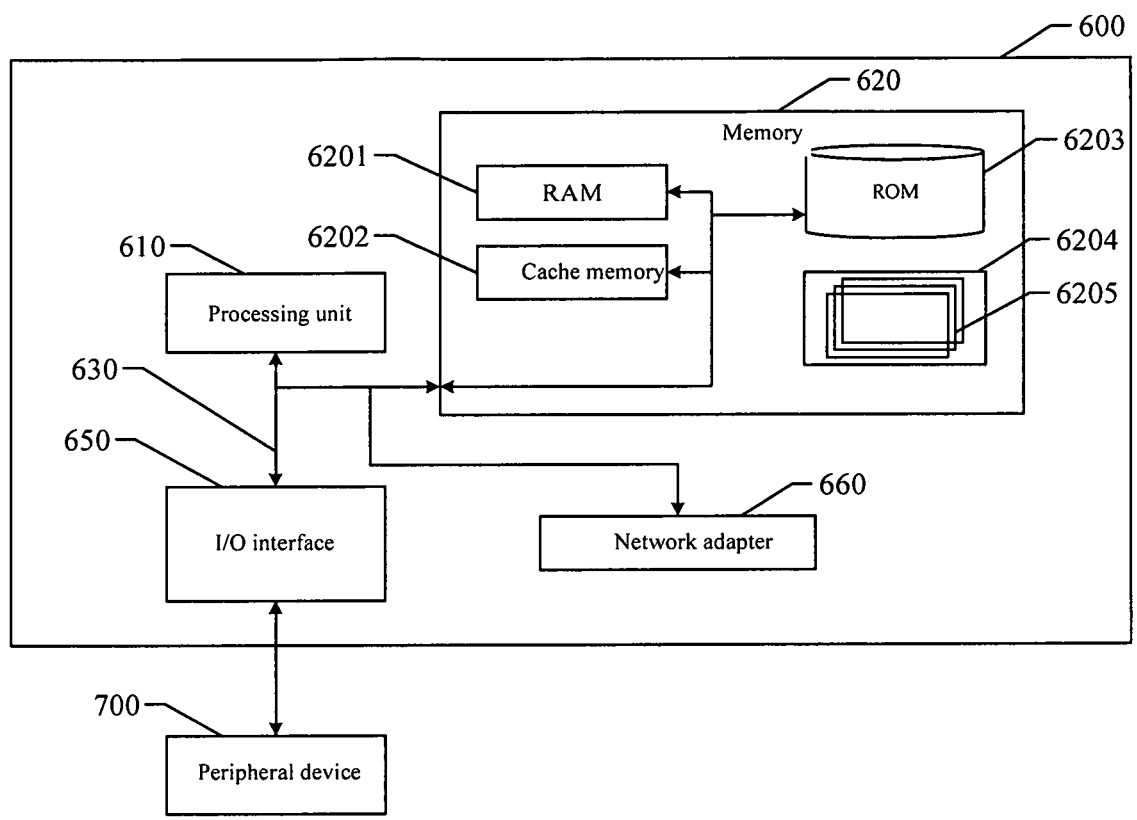
FIG. 9 schematically illustrates a schematic diagram of an electronic device according to an exemplary arrangement of the present disclosure.

As shown in FIG. 9, the electronic device 600 is shown in the form of a general-purpose computing device. Components of the electronic device 600 may include, but are not limited to: at least one processing unit 610, at least one memory 620, and a bus 630 connecting different system components (including the memory 620 and the processing unit 610).

The memory 620 stores a program code, which may be executed by the processing unit 610, such that the processing unit 610 performs steps described in the exemplary method portions of the specification according to exemplary arrangements of the present disclosure. For example, the processing unit 610 may perform Step S1 as shown in FIG. 1: monitoring whether a protected object is within a preset range of a dangerous device; Step S2: starting a tracking mode for the protected object when monitoring that the protected object is within the preset range of the dangerous device; and Step S3: monitoring in real time whether the protected object satisfies a preset condition in the tracking mode, and cutting off a power supply of the dangerous device when the protected object satisfies the preset condition. The processing unit 610 can include a processor and perform its functions through a processor and program The memory 620 may include readable media in the form of volatile memory, such as a random access memory (RAM) 6201 and/or a cache memory 6202. Furthermore, the memory 620 may further include a read-only memory (ROM) 6203.

The memory 620 may include a program/utility tool 6204 having a group of (at least one) program modules 6205. The program modules 6205 include, but are not limited to: an operating system, one or more applications, other program modules and program data. Each or a certain combination of these examples may include implementation of network environment.

The bus 630 may represent one or more of a plurality of bus structures, including a memory bus or memory controller, a peripheral bus, an accelerated graphics port, a processing unit or a local bus using any bus structure among the plurality of bus structures.

The electronic device 600 may communicate with one or more peripheral devices 700 (such as keyboards, pointing devices, Bluetooth devices, etc.), and also may communicate with one or more devices allowing a user to interact with the electronic device 600, and/or may communicate with any device (for example, a router, a modem and so on) allowing the electronic device 600 to communicate with one or more other computing devices. This communication may be implemented by means of an input/output (I/O) interface 650. Moreover, the electronic device 600 also may communicate with one or more networks (for example, a local area network (LAN), a wide area network (WAN) and/or a public network such as the Internet) via a network adapter 660. As shown in FIG. 6, the network adapter 660 communicates with other modules of the electronic device 600 through the bus 630. It should be understood that although not shown in the figures, other hardware and/or software modules may be used in combination with the electronic device 600, including but not limited to: microcode, device drivers, redundancy processing units, external disk drive arrays, redundant arrays of independent disks (RAID) systems, tape drives and data backup and storage systems, etc.

With description of the above arrangements, it will be readily understood by those skilled in the art that the exemplary arrangements described herein may be implemented by software or may be implemented by means of software in combination with the necessary hardware. Thus, the technical solution according to the arrangements of the present disclosure may be embodied in the form of a software product which may be stored in a nonvolatile storage medium (which may be CD-ROM, USB flash disk, mobile hard disk and the like) or on network, including a number of instructions for enabling a computing device (which may be a personal computer, a server, a terminal device, or a network device and the like) to perform the method according to the arrangements of the present disclosure.

In an exemplary arrangement of the present disclosure, there is further provided a computer readable storage medium storing a program product capable of implementing the above method in the specification. In some possible arrangements, aspects of the present disclosure may be implemented as a form of a program product, which includes a program code. When the program product runs on the terminal device, the program code is used for enabling the terminal device to perform the steps described in the above exemplary method portions of this specification according to the exemplary arrangements of the present disclosure.

Figure 10:
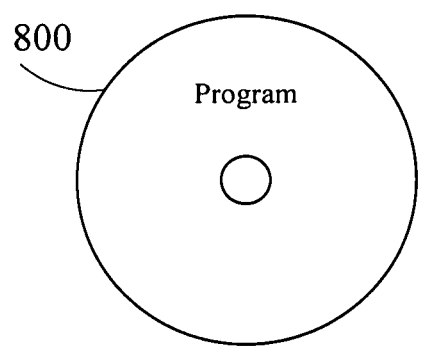
FIG. 10 schematically illustrates a schematic diagram of a program product according to an exemplary arrangement of the present disclosure.

Referring to FIG. 10, a program product 800 configured to implement the above method is described according to the arrangements of the present disclosure. The program product 800 may adopt a portable compact disc read-only memory (CD-ROM) and include a program code, and may run on a terminal device such as a personal computer. However, the program product of the present disclosure is not limited thereto. In this document, a readable storage medium may be any tangible medium that can contain or store a program for use by or in connection with an instruction execution system, apparatus, or device.

Any combination of one or more readable medium(s) may be utilized by the program product. The readable medium may be a readable signal medium or a readable storage medium. The readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the readable storage medium include the following: an electrical connection having one or more wires, a portable diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

A computer readable signal medium may include a propagated data signal with readable program code embodied therein, for example, in baseband or as part of a carrier wave. Such a propagated data signal may take any of a variety of forms, including, but not limited to, electro-magnetic, optical, or any suitable combination thereof. A readable signal medium may be any readable medium that is not a readable storage medium and that can communicate, propagate, or transport a program for use by or in connection with an instruction execution system, apparatus, or device.

Program code embodied on a readable medium may be transmitted using any appropriate medium, including but not limited to wireless, wireline, optical fiber cable, RF, etc., or any suitable combination of the foregoing.

Program code for carrying out operations of the present disclosure may be written in any combination of one or more programming languages, including an object-oriented programming language such as Java, C++ or the like and conventional procedural programming languages, such as the "C" programming language or similar programming languages. The program code may execute entirely on the user's computing device, partly on the user's computing device, as a stand-alone software package, partly on the user's computing device and partly on a remote computing device or entirely on the remote computing device or server. In the latter scenario, the remote computing device may be connected to the user's computing device through any type of network, including a local area network (LAN) or a wide area network (WAN), or the connection may be made to an external computing device (for example, through the Internet using an Internet Service Provider).

Moreover, the above accompanying drawings are merely illustrative description of processes included in the method according to the exemplary arrangements of the present disclosure and are not intended to limit the present disclosure. It is easy to understand that the processes shown in the above accompanying drawings do not indicate or limit time sequences of these processes. Furthermore, it is also easy to understand that these processes may be executed, for example, synchronously or asynchronously in a plurality of modules.

Other arrangements of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and arrangements be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. An intelligent control method, comprising:
monitoring, by a monitoring module, whether a protected object is within a preset range of a dangerous device;
in response to determining that the protected object is within the preset range of the dangerous device, starting, by a tracking module connected to the monitoring module, a tracking mode for monitoring the protected object, wherein monitoring in the tracking mode comprises using an image capturing apparatus to capture consecutive images; and
monitoring, by a processing unit in real time, whether the protected object satisfies a preset condition in the tracking mode by:
using a distance sensor to monitor in real time to determine whether a distance between the protected object and the dangerous device is less than a preset distance; and
using the image capturing apparatus to monitor in real time whether the protected object is identified in association with a preset action of wanting to touch the dangerous device;
transmitting a processing result indicative of cutting off or not cutting off a power supply of the dangerous device to a client device in response to determining that the protected object satisfies the preset condition; and
executing a deep learning routine based on feedback information returned in response to the processing result, wherein executing the deep learning routine comprises extracting and recognizing feature information of the protected object and feature information of the dangerous device to establish a neural network model configured to implement the deep learning routine;
wherein recognizing feature information comprises a first level of recognition where height, skin color, expression, and facial feature models are established for the protected object, and appearance, color, and state models are established for the dangerous device; and
wherein recognizing feature information further comprises a second level of recognition where feature models of the protected object and feature models of the dangerous device obtained from the first level of recognition and samples obtained at different distances are provided as inputs of the neural network model, and the distance and whether the distance between the protected object and the dangerous device being less than the preset distance are outputs of the neural network model.

2. The intelligent control method according to claim 1, wherein monitoring whether the protected object is within a preset range of the dangerous device comprises:
   monitoring whether an unknown object exists within the preset range of the dangerous device;
   capturing image information of the unknown object when the unknown object exists within the preset range of the dangerous device; and
   determining whether the unknown object is the protected object based on the image information of the unknown object.

3. The intelligent control method according to claim 2, further comprising: receiving feature information of the protected object and feature information of the dangerous device to store the feature information into a sample database in an intelligent control system, the feature information of the protected object comprising multi-angle image information and physique information.

4. The intelligent control method according to claim 2, further comprising: emitting preset audio to instruct the protected object to leave when the protected object satisfies the preset condition.

5. The intelligent control method according to claim 2, further comprising: starting a preset device to instruct the protected object to leave when the protected object satisfies the preset condition.

6. The intelligent control method according to claim 1, wherein the cutting off a power supply of the dangerous device comprises: transmitting a request of cutting off the power supply of the dangerous device to a router, such that the router cuts off the power supply of the dangerous device by way of wireless control.

7. The intelligent control method according to claim 6, further comprising: receiving feature information of the protected object and feature information of the dangerous device to store the feature information into a sample database in an intelligent control system, the feature information of the protected object comprising multi-angle image information and physique information.

8. The intelligent control method according to claim 1, further comprising: receiving feature information of the protected object and feature information of the dangerous device to store the feature information into a sample database in an intelligent control system, the feature information of the protected object comprising multi-angle image information and physique information.

9. The intelligent control method according to claim 1, further comprising: emitting preset audio to instruct the protected object to leave when the protected object satisfies the preset condition.

10. The intelligent control method according to claim 1, further comprising: starting a preset device to instruct the protected object to leave when the protected object satisfies the preset condition.

11. The intelligent control method according to claim 1, wherein monitoring in real time whether the protected object satisfies the preset condition comprises:
    monitoring in real time whether a distance between the protected object and the dangerous device is less than a preset distance; and
    monitoring in real time whether the protected object is associated with a preset action.

12. The intelligent control method according to claim 11, wherein the preset action is a symbolic action indicative of the protected object wanted to touch the dangerous device.

13. An intelligent control system, comprising:
    a monitoring module configured to monitor whether a protected object is within a preset range of a dangerous device;
    a tracking module connected to the monitoring module and configured to start a tracking mode for the protected object in response to determining that the protected object is within the preset range of the dangerous device;
    wherein the monitoring module is further configured to monitor in real time whether the protected object satisfies a preset condition in the tracking mode by:
       using a distance sensor to monitor in real time to determine whether a distance between the protected object and the dangerous device is less than a preset distance; and
       using an image capturing apparatus to monitor in real time whether the protected object identified in association with a preset action of wanting to touch the dangerous device; and
    a control module connected to the tracking module and configured to cut off a power supply of the dangerous device in response to determining that the protected object satisfies the preset condition, wherein the control module comprises a training unit configured to:
       transmit a processing result indicative of cutting off or not cutting off the power supply of the dangerous device to a client device;
       execute a deep learning routine based on feedback information returned in response to the processing result, wherein executing the deep learning comprises extracting and recognizing feature information of the protected object and feature information of the dangerous device to establish a neural network model configured to implement the deep learning, wherein recognizing feature information comprises:
          a first level of recognition where height, skin color, expression, and facial feature models are established for the protected object, and appearance, color and state models are established for the dangerous device; and
          a second level of recognition where feature models of the protected object and feature models of the dangerous device obtained from the first level of recognition and samples obtained at different distances are provided to the neural network model as inputs, and the distance and whether the distance between the protected object and the dangerous device being less than the preset distance outputs of the neural network model.

14. The intelligent control system according to claim 13, wherein the monitoring module comprises:
    an infrared sensor configured to monitor whether an unknown object exists within the preset range of the dangerous device;
    an image capturing apparatus configured to capture image information of the unknown object in response to determining that the unknown object exists within the preset range of the dangerous device;
    a distance sensor configured to monitor in real time whether a distance between the protected object and the dangerous device is less than a preset distance; and
    a processing unit connected to the infrared sensor, the image capturing apparatus, and the distance sensor, and the processing unit being configured to determine whether the unknown object is the protected object based on the image information of the unknown object;

wherein the image capturing apparatus is further configured to monitor in real time whether the protected object is identified in association with a preset action.

15. The intelligent control system according to claim 13, wherein the control module comprises:
- a first control unit configured to transmit a request of cutting off the power supply of the dangerous device to a router, such that the router cuts off the power supply of the dangerous device by way of wireless control; and
- a second control unit configured to control a loudspeaker to emit preset audio to attract the protected object to leave when the protected object satisfies the preset condition.

* * * * *